Patented Feb. 13, 1951

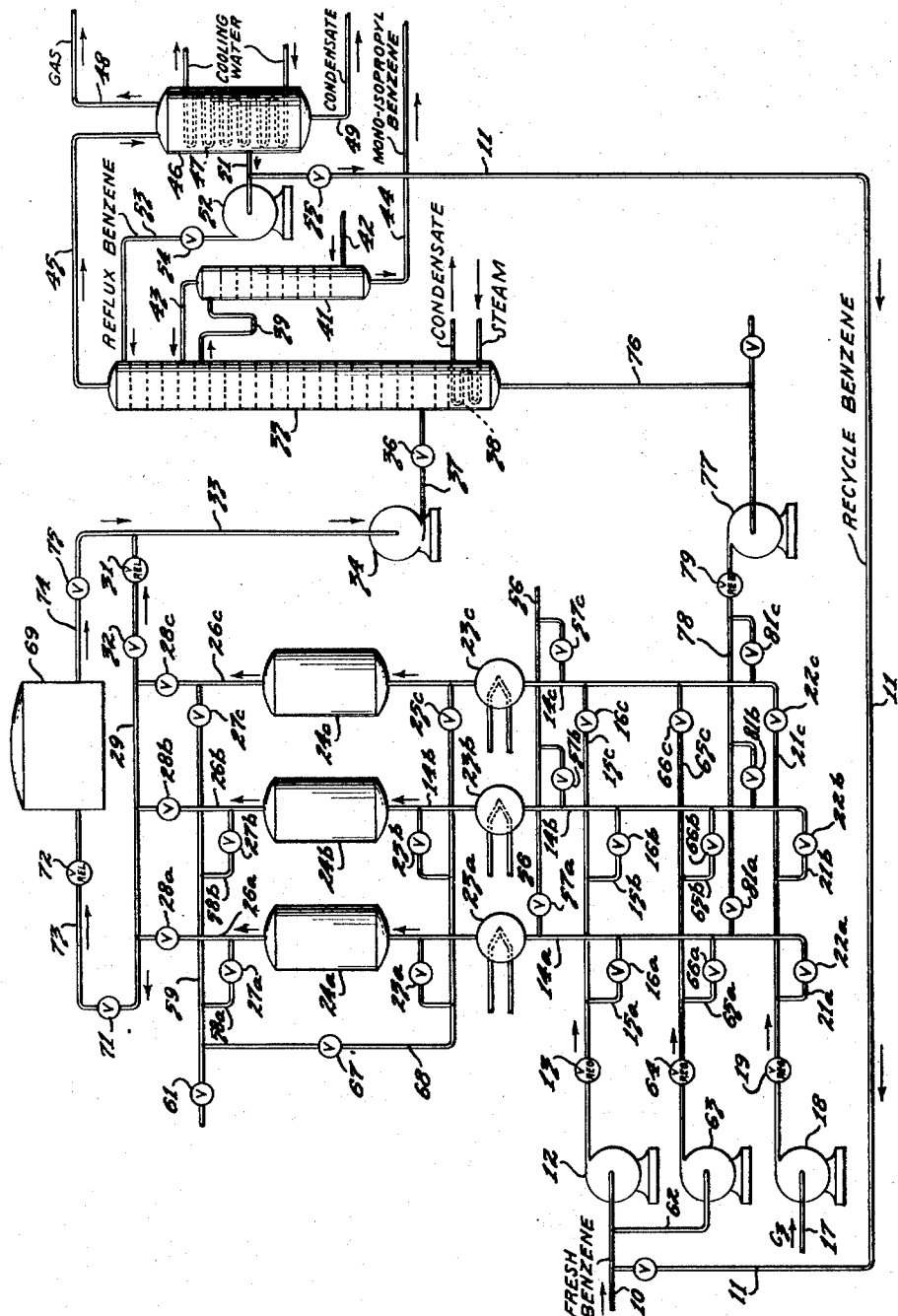

2,541,044

UNITED STATES PATENT OFFICE 2,541,044

CATALYTIC ALKYLATION

James P. Daugherty, Swarthmore, Pa., assignor to Houdry Process Corporation, Wilmington, Del., a corporation of Delaware Application December 17, 1947, Serial No. 792,283

7 Claims. (Cl. 260—671)

The present invention relates to alkylation processes in which are employed solid adsorptive alkylation catalysts whose alkylation activity decreases as the time of contact of the reactants and the catalyst (the time on stream) increases and is particularly concerned with methods by which the decreased activity of the catalyst can be efficiently restored.

In alkylation processes of the type involved herein, the alkylation is effected by flowing alkylatable hydrocarbon material and alkyl supplying hydrocarbon material into an alkylation zone containing a solid adsorptive alkylation catalyst and reacting these hydrocarbon materials to form one or more alkyl derivatives of the alkylatable hydrocarbon material. Alkylation reactions can be effected, as is known to the art, under a variety of conditions of temperature and pressure, and the hydrocarbons may be present under vapor, liquid or mixed phase conditions. In a preferred method of operation, the alkylation zone is under sufficient pressure so that the hydrocarbons present are in the liquid phase and the catalyst is maintained at a temperature sufficiently elevated, such as a temperature in the range of about 100° to about 600° F., so that the desired alkylation reaction is speedily effected. A mixture of the alkylated products and any unreacted hydrocarbon material is continuously removed from the alkylation zone and one or more desired hydrocarbons separated from the mixture. In many cases, high yields of lower alkylates, which frequently are the desired products, can be obtained by recycling higher alkylates.

The alkylation activity of the solid adsorptive catalyst decreases as the time on stream increases and it is ultimately necessary to stop the alkylation reaction and treat the catalyst so as to restore its activity. The decrease of activity referred to is a temporary effect in the sense that it is caused by a hydrocarbonaceous deposit on the catalyst, and is not an alteration of the catalyst per se. I attribute the source of this catalyst deposit to the accumulation of relatively high molecular weight polymers or alkylates by selective adsorption. Known methods of restoring the activity have serious disadvantages. Thus, steaming the catalyst permanently impairs the activity of the catalyst unless considerable precautions, including the use of low temperatures and pressures, are used; indeed, some of the catalysts referred to herein are unable to withstand any treatment with steam. Another method of removing the catalyst deposit is by combustion but such a procedure involves an inefficient cycle of heating and cooling of the catalyst over a considerable temperature range since such combustion is commercially feasible only at temperatures above 850° F. whereas the maximum temperature of the alkylation process is generally below about 600° F.

I have discovered, in accordance with the present invention, that I can efficiently restore or regenerate the catalytic activity of solid adsorptive alkylation catalysts whose activity has decreased due to use in alkylation processes of the type herein described, by flowing alkylatable hydrocarbon material through such a catalyst under liquid phase conditions and at elevated alkylation temperatures (i. e. temperatures at which alkylation reactions are generally conducted). I have further found that particularly effective results are obtained when the alkylation zone containing the catalyst, and the hydrocarbon material therein, are continuously maintained under liquid phase conditions during both the on stream and regeneration periods (i. e. the hydrocarbons in the alkylation zone are not subjected to pressures low enough to cause vaporization at any time).

Thus I may effect continuously an alkylation reaction of the type herein described for a predetermined interval of on stream time, periodically interrupt the flow of alkyl supplying hydrocarbon material to the alkylation zone at the end of each of such predetermined intervals and during the period of interrupted flow of alkyl supplying hydrocarbon material, flow alkylatable hydrocarbon material through the catalyst for a length of time, generally less than the interval of on stream time, sufficient to effect a substantial restoration of the alkylation activity of the catalyst while continuously maintaining the alkylation zone under liquid phase conditions. Thereafter, I resume the flow of said alkyl supplying hydrocarbon material to the alkylation zone for another on stream period, and repeat the regeneration operation after the appropriate on stream period. By repeating this cycle of operations, I have found that the catalyst can be maintained at an efficient level of alkylation activity for extended periods of time. After several weeks or months of operation, I may find it desirable to regenerate the catalyst by combustion.

I believe, although I do not wish to be bound by any theory in the practice of my invention, that the alkylatable hydrocarbon material, in the absence of the alkyl supplying material, reacts with the high molecular weight polymers or alkylates thought to constitute the deactivating deposit on the catalyst so as to form lower molecular weight compounds as by alkyl shifts, depolymerization or similar reactions with the subsequent desorption of such lower molecular weight compounds from the catalyst.

The present invention generally involves alkylation processes of the type in which the alkylatable material is an aromatic hydrocarbon having from six to twenty carbon atoms inclusive, in the molecule. I may alkylate the unsubstituted mononuclear aromatic hydrocarbon, benzene, or I may alkylate unsubstituted polynuclear aromatic hydrocarbons having fused or condensed benzene nuclei, such as naphthalene, anthracene, phenanthrene, chrysene and the like, or having two or more separate or noncondensed benzene nuclei such as diphenyl, terphenyl and the like, or having both separate and condensed nuclei such as dinaphthyl. I may also alkylate alkyl substituted aromatic hydrocarbons, such as toluene, butyl naphthalene and the like, and prefer, when employing alkyl substituted aromatic hydrocarbons, that the hydrocarbon have less than three alkyl substitutions which may be of the open chain type, such as dibutyl benzene, diphenylethane and the like, or of the closed chain type, such as tetralin, fluorene and the like.

The alkyl supplying hydrocarbon material may be a monoolefin, preferably having less than ten carbon atoms, such as ethylene, propylene, decene, cyclohexene, cyclopentene and the like or it may be a polysubstituted alkyl aromatic, such as can be formed by alkylation of the hydrocarbons referred to above, which aromatic has a greater number of open chain alkyl groups than the aromatic hydrocarbon to be alkylated. I may use the latter type of alkyl supplying hydrocarbon material either alone, in which event the alkylation proceeds by an alkyl shift, or I may use it together with the former type as a means of suppressing the formation of higher homologues.

With either the alkylatable or the alkyl supplying hydrocarbon material I may use an inert solvent or diluent, such as a paraffin hydrocarbon; a particular use of such a diluent being illustrated by its use with a hydrocarbon material which is solid at ordinary temperatures.

As catalyst for the alkylation process, I employ a solid adsorptive surface active contact mass which is preferably refractory in the sense that it can be subjected to high temperatures, such as between 800° and 1200° F. or higher for the purpose of burning off a hydrocarbonaceous deposit without loss of alkylation activity or loss of a portion of the composition. Suitable catalysts are porous masses of plural refractory oxides such as combinations of silica with one or more oxides of aluminum, zirconium, thorium, uranium, titanium, vanadium and the like, prepared by methods known to the art. The catalyst may consist of the catalytically active material or it may comprise an inert or active carrier on which is deposited an active alkylation catalyst such as phosphates of copper, cadmium, the alkaline earths and the like. In general, the catalyst should be unchanged by the alkylation process and should contain little, if any, components soluble in or changed by the reactant liquids. Indeed, any catalyst known to the art which has the properties described can be used.

The present invention is hereafter described in terms of an exemplary operation in connection with the drawing, which operation, it is to be understood, does not restrict the scope of the invention. In the drawing, which is a schematic flow diagram in which details of auxiliary equipment have been omitted for brevity, alkylatable hydrocarbon material such as fresh benzene in line 10 together with recycle benzene from line 11, which recycle benzene being obtained as hereinafter described, is forced under pressure such as a pressure from 50 to 1000 pounds per square inch, for example about 500 pounds per square inch, by pump 12 through a pressure regulating valve 13 and enters one or more lines 14a, 14b or 14c through one or more lines 15a, 15b or 15c, appropriate valves 16a, 16b or 16c being open. An alkyl supplying hydrocarbon material such as a propylene fraction, which may be substantially pure propylene or may contain a substantial amount such as 80 to 90 volume percent of saturated paraffins of like boiling point, in line 17 is forced under a similar pressure as used for the benzene by pump 18 through pressure regulating valve 19 into one or more lines 14a, 14b or 14c by means of appropriate lines 21a, 21b or 21c, appropriate valves 22a, 22b or 22c being open. The mixture of benzene and propylene fraction in lines 14a, 14b or 14c passes through appropriate heat interchangers 23a, 23b or 23c, so as to preheat the mixture to a temperature above room temperature, for example to about 425° F. The mixture thereafter enters appropriate pressure vessel 24a, 24b or 24c, appropriate valves 25a, 25b or 25c being closed. Pressure vessels 24a, 24b and 24c contain alkylation catalyst of the type previously described and comprise a plurality of alkylation zones. The mixture of benzene and propylene fraction is passed through the pressure vessels under liquid phase conditions as, for example at 500 pounds per square inch and at temperatures of about 430° F., and the mixture of resultant alkylation products and unconverted reactants is removed by appropriate lines 26a, 26b or 26c, appropriate valves 27a, 27b or 27c being closed and appropriate valves 28a, 28b or 28c being open.

The products and unconverted reactants are thereafter passed by manifold 29 through a pressure reducing valve 31, valve 32 being open, to line 33 in which the pressure is low, for example about 15 pounds per square inch and charged by pump 34 to a fractionating column 35, valve 36 in line 37 being adjusted to provide the proper feed rate to the column. The column, for which heat is furnished by a steam coil 38, fractionates the mixture of products and unconverted reactants according to their boiling points. Near the top of the column a mixture of monoisopropyl benzene and lighter components is taken off by line 39 and fed to the top of a stripping column 41. Steam, which is fed near to bottom of column 41 by line 42, strips lighter components from the monoisopropyl benzene. The lighter components and uncondensed steam are removed from column 41 and are fed back to column 35 by means of line 43. The bottoms from column 41, which consist principally or completely of monoisopropyl benzene, are removed by line 44 and conveyed to storage or any desired use. The overhead from column 35, which consists principally of any saturated hydrocarbons present in the original propylene cut, unreacted benzene and uncondensed steam, is removed by line 45 and fed to a separator 46 which is cooled by cooling coil 47. Gases such as propane which are not condensed at ordinary temperatures are removed from separator 47 by line 48 for any appropriate use; and condensed steam is removed by line 49 and condensed benzene is removed by line 51. The cool benzene in line 51 may be returned to column 35 to furnish reflux therein by pump 52 and line 53, valve 54 being at least partially open. If desired, a portion of this benzene may be added to the fresh benzene in line 10 by manipulating valve 55 in line 11.

As discussed above, after a certain period of on stream time, the catalyst in vessels 24a, 24b or 24c becomes less efficient by reason of a drop in the alkylation activity. Such a drop in activity may occur after widely different periods of on stream time depending upon the conditions under which the alkylation is effected; for example an efficient period of on stream operation may vary between about one to twenty-four hours or even more. Also the period of on stream time may be determined by the allowable drop of activity; this allowable drop being determined by considerations of engineering economics. At any event, after a predetermined interval of on stream time, the flow of propylene to one of the cases, for example 24a, is interrupted by closing valve 22a. The vessel may be flushed of the bulk of the liquid therein by high pressure inert gas, such as dry nitrogen, methane, spent flue gas and the like introduced by line 56 through valve 57a, the liquid material in the case passing out through line 58a to manifold 59, valves 61 and 27a being open and valves 25a and 28a being closed. It is essential that this gas be at a pressure such that the hydrocarbons present in vessel 24a remain in the liquid phase; moreover, insufficient gas is passed through the zone to cause substantial vaporization of the hydrocarbons present. If desired, however, this flushing step may be omitted. At any event, benzene from line 10 is charged from line 62 by pump 63 through a pressure regulating valve 64 to line 65a, valve 66a being open and valves 66b, 66c, 16a and 22a being closed, substantially immediately following the interruption of flow of the propylene fraction to the vessel 24a. It is advantageous, particularly since propylene vaporizes more easily than the benzene, to increase the pressure of benzene in vessel 24a during the regeneration period to substantially the total on stream pressure.

The benzene thus charged to vessel 24a passes through heat exchanger 23a which may be operated so as to shorten the period of regeneration by heating the benzene to the temperature of the alkylation reaction or even above, particularly when the temperature of reaction is low. The higher temperature may be used for only a portion of the regeneration period, the temperature of the benzene during the latter portion of this period being adjusted so that the catalyst is cooled to the reaction temperature in preparation for the on stream period.

The benzene from line 65a is introduced to vessel 24a under liquid phase conditions and is passed therethrough for a sufficient period of time to substantially restore the alkylation activity of the catalyst. This period of time will vary with the drop in activity which occurred during on stream period, with the rate at which the benzene is passed through the vessel and with the temperature of the operation, but will seldom, if ever, be as great as a period of on stream operation, preferably being a small fraction thereof such as less than ¼ of the on stream period or interval. When it is desired to maintain a continuous stream of material from the alkylation zones to column 35, the length of time for the reactivation of the catalyst may be correlated with the number of alkylation zones, for example, 6 vessels may be used and the period for the restoration of the activity may be ⅕ of the on stream period, thus permitting 5 vessels to be on stream while one is being restored to activity.

In one embodiment of the invention, heat interchanger 23a may be operated so that the benzene enters vessel 24a at a temperature sufficiently below that of the catalyst so that exothermic heat of alkylation stored in the catalyst during the on stream period is removed by the benzene during the period of regeneration. In this event, heat absorbed by the benzene may be usefully used in the process to supply all or a part of the heat necessary to preheat the benzene to be reacted. Thus, benzene so heated is directed from the vessel being regenerated to a vessel on stream as by closing valve 61, opening valve 67 and 25b, and thereby passing the heated benzene by line 68 to line 14b, the heated benzene being all or a part of the benzene supplied to vessel 24b.

However, the process may be operated so that the production of alkylated products is not always at the same rate; i. e. the total number of vessels and the period of regeneration are not correlated in the manner described above. In this event, the rate of production of the alkylated products may at times be greater than the average rate of feed to column 35. The excess of this material may be stored in a tank 69 by closing valve 32 and opening valve 71, the effluent material from the vessels on stream thereby passing through open valve 71 and line 73 to tank 69 from which the material to be fractionated is removed as needed by line 74, valve 75 regulating the rate of withdrawal.

In some cases it may be desirable to increase the yield of the monosubstituted material by recycling polysubstituted material. This may be effected by removal of the bottoms of column 35 through line 76 and charging them by pump 77 and line 78 through pressure regulating valve 79, appropriate valves 81a, 81b or 81c being open.

It is to be understood that the present invention includes within its scope the use of vessels 24a, 24b and 24c for processes which are referred to as alkylation or dealkylation or a combination of both as in the case of the recycle of the bottoms of fractionator 35. Thus the alkylatable material may be charged to the alkylation zone with only mono-olefinic hydrocarbons as the only alkyl supplying material; or alkylatable material may be charged to the alkylation zone with only polysubstituted aromatic hydrocarbons having more alkyl substitutions than the alkylatable hydrocarbon; or the alkylatable material may be charged to the alkylation zone with both types of alkyl supplying hydrocarbon material. In general, the preferred temperatures for first mentioned type of operation are lower than the temperatures for the second and third operations. In addition, the type of mono-olefinic material used may also determine the temperature of operation; higher temperatures of about 400 to about 600° F., being preferred for operations employing ethylene; lower temperatures of about 100° to about 300° F. giving satisfactory results when butylene is employed and intermediate temperatures of about 150° to 450° F. being effective for alkylations using propylene. Since the temperatures of this operation are well known to the art, further details need not be given here.

In order to illustrate embodiments of the present invention and illustrate its advantages but not to be construed as a limitation thereof, the following examples are given.

Example I

Monoisopropyl benzene was prepared by a cyclic process in which a mixture consisting of 30 percent recycle benzene, 12 percent fresh benzene, and 58 percent of a high boiling recycle fraction containing polypropylated benzenes (obtained by fractionation of alkylated reaction products after the manner described in connection with the drawing) together with a liquefied propylene fraction containing about 95 volume percent propylene, the mol ratio of propylene to total benzene being about one, was preheated to 425°–430° F. and fed to a pressure vessel containing small molded pellets of a synthetic silica-alumina catalyst substantially free of alkali metal which catalyst had been prepared by a method known to the art (see, for example, U. S. Patent 2,429,981 issued on November 4, 1947, to J. R. Bates) and had been calcined at 1100° F. prior to use. The combined feed stock was passed through the catalyst at a space velocity of about one (where space velocity is the liquid volume of reactants passed through a unit volume of catalyst in one hour) for about 5 hours, during which time the temperature of the catalyst was between 360° and 450° F. During this time, a pressure of 500 pounds per square inch was maintained in the pressure vessel. At the end of this period, the flow of propylene to the vessel was interrupted. The liquid contents of the pressure vessel were quickly displaced with nitrogen gas at 500 pounds per square inch and substantially immediately thereafter benzene was passed through the catalyst in the vessel for about 1 hour after which the flow of propylene was resumed thus completing 1 cycle of operation. This cycle was repeated for a continuous period of several days.

Analysis of the alkylation products removed from the pressure vessel showed that the efficiency of propylene utilization was virtually the same for the eighth cycle as for the first cycle on unused catalyst (being 95 and 97 percent propylene reacted, respectively) and that the average amount of monoisopropyl benzene formed per cycle in the first eight cycles was 12.4 volume percent of the liquid products. The amount of hydrocarbonaceous deposit on a sample of the catalyst after the eight run was found to be 5.0 grams of carbon per liter of catalyst.

Example II

Several cycles were made in a trial run under the conditions set forth in Example I except that the pressure in the pressure vessel was released at the end of the on stream period and prior to the introduction of benzene alone. At the end of three cycles, a sample of the catalyst was tested and found to have a hydrocarbonaceous deposit of 5.4 grams of carbon per liter, about 8 percent more than was found on the catalyst in Example I after a period almost three times as long. The amount of monoisopropyl benzene formed during the third cycle of this run (in which the pressure was released) was about 80 percent of the amount during the third cycle of the run in Example I (where the pressure in the pressure vessel was uninterruptedly maintained at 500 pounds per square inch; i. e. the hydrocarbons in the pressure vessel were maintained in liquid phase).

The advantages of the regeneration were demonstrated in a trial run under substantially the same conditions as Examples I and II, using the same charge materials and a fresh batch of the same lot of catalyst. The amount of monoisopropyl benzene formed in the first cycle was 12.5 volume percent of the liquid products, and 92 percent of the propylene was consumed. This catalyst, after the first on stream period, was shown by test to have a hydrocarbonaceous deposit amounting to 9.0 grams of carbon per liter which is 80 percent more than in Example I and 72 percent more than in Example II, even though the operations in the examples were continued for much longer periods of time.

Obviously many modifications and variations of the invention as hereinbefore set forth may be made without departing from the spirit and scope thereof and therefore only such limitations should be imposed as are indicated in the appended claims.

I claim as my invention:

1. In an alkylation process which comprises flowing alkylatable hydrocarbon material and alkyl supplying hydrocarbon material reactable therewith into an alkylation zone containing a solid adsorptive alkylation catalyst, reacting in said zone said alkylatable hydrocarbon material and said alkyl supplying hydrocarbon material to form alkylated hydrocarbon material under alkylation conditions at elevated temperature, and removing said alkylated hydrocarbon material from said zone, the alkylation activity of said catalyst decreasing as the time on stream continues, the improvement which comprises periodically interrupting the flow of alkyl supplying hydrocarbon material to said zone at predetermined intervals of on stream time, during the period of interrupted flow of said alkyl supplying hydrocarbon material flowing alkylatable hydrocarbon material through said adsorptive catalyst in said zone under liquid phase conditions and at elevated alkylation temperatures for a length of time sufficient to effect a substantial restoration of the alkylation activity of said catalyst, and resuming flow of said alkyl supplying hydrocarbon materials to said zone.

2. In an alkylation process which comprises flowing alkylatable hydrocarbon material and alkyl supplying hydrocarbon material reactable therewith into an alkylation zone containing a solid adsorptive alkylation catalyst, reacting in said zone said alkylatable hydrocarbon material and said alkyl supplying hydrocarbon material to form alkylated hydrocarbon material under liquid phase alkylation conditions at elevated temperature, and removing said alkylated hydrocarbon material from said zone, the alkylation activity of said catalyst decreasing as the time on stream continues, the improvement which comprises periodically interrupting the flow of alkyl supplying hydrocarbon material to said zone at predetermined intervals of on stream time, during the period of interrupted flow of said alkyl supplying hydrocarbon material flowing said alkylatable hydrocarbon material through said adsorptive catalyst in said zone for a length of time sufficient to effect a substantial restoration of the alkylation activity of said catalyst, maintaining said alkylation zone under uninterrupted liquid phase conditions at all times, and resuming flow of said alkyl supplying hydrocarbon materials to said zone.

3. The improvement of claim 2 in which the alkylatable hydrocarbon material comprises benzene and the alkyl supplying material comprises propylene.

4. The improvement of claim 2 in which the alkylatable hydrocarbon material comprises benzene and the alkyl supplying material comprises propylated benzenes containing at least two propyl groups.

5. The improvement of claim 2 in which the pressure of alkylatable hydrocarbon material in the alkylation zone during the period of interrupted flow of the alkyl supplying material is substantially equal to the total on stream pressure in said zone.

6. In an exothermic alkylation process which comprises flowing alkylatable hydrocarbon material and alkyl supplying hydrocarbon material reactable therewith into an alkylation zone containing a solid adsorptive alkylation catalyst, reacting in said zone said alkylatable hydrocarbon material and said alkyl supplying hydrocarbon material to form alkylated hydrocarbon material under liquid phase alkylation conditions at elevated temperature, and removing said alkylated hydrocarbon material from said zone, the alkylation activity of said catalyst decreasing as the time on stream continues, the improvement which comprises effecting said alkylation in a plurality of zones, periodically interrupting the flow of alkyl supplying hydrocarbon material to one of said zones at the end of a predetermined interval of on stream time whereby said zone is off stream while remaining on stream with at least one other of said zones, during the period of interrupted flow of alkyl supplying hydrocarbon material flowing said alkylatable hydrocarbon material through the catalyst in the off stream zone for a length of time sufficient to effect a substantial restoration of the alkylation activity of said catalyst, said length of time being related to the number of zones and the on stream time so that continuous production is maintained, said alkylatable hydrocarbon material being at a temperature substantially below that of the catalyst so as to remove exothermic heat of alkylation from the catalyst, and periodically changing the zone in which the above described operation is effected.

7. The improvement of claim 6 in which the effluent alkylatable hydrocarbon material from the off stream zone forms at least a portion of the alkylatable hydrocarbon material charged to an on stream zone whereby the exothermic heat of alkylation is indirectly used to preheat the reactants.

JAMES P. DAUGHERTY.

REFERENCES CITED

The following references are of record in the file of this patent:

UNITED STATES PATENTS

| Number | Name | Date |
|---|---|---|
| 1,904,218 | Franceway | Apr. 18, 1933 |
| 1,962,752 | Stratford | June 12, 1934 |
| 2,186,022 | Holm et al. | Jan. 9, 1940 |
| 2,234,177 | Kanhofer | Mar. 11, 1941 |
| 2,374,600 | Ipatieff et al. | Apr. 24, 1945 |
| 2,382,318 | Ipatieff et al. | Aug. 14, 1945 |
| 2,421,331 | Johnson | May 27, 1947 |
| 2,425,493 | Stapleton | Aug. 12, 1947 |